United States Patent
Thiru et al.

(10) Patent No.: US 11,836,468 B2
(45) Date of Patent: Dec. 5, 2023

(54) DIGITAL COMPLIANCE PLATFORM

(71) Applicant: SAP SE, Walldorf (DE)

(72) Inventors: Karthik Thiru, Bangalore (IN); Ravi Natarajan, Bangalore (IN); Prateek Tripathi, Bangalore (IN); Soumya Ranjan Das, Cuttack (IN); Ankit Jain, Bhopal (IN); Kishan Rao Ramesh Yaradi, Bangalore (IN); Vijayalakshmi Mohandoss, Bangalore (IN); Avinash Bhaskar, Bangalore (IN); Kartik Chandra, Navi Mumbai (IN); Pavithra Thiagarajan, Bangalore (IN); Yatendra Kumar Tiwari, Aligarh (IN)

(73) Assignee: SAP SE, Walldorf (DE)

( * ) Notice: Subject to any disclaimer, the term of this patent is extended or adjusted under 35 U.S.C. 154(b) by 274 days.

(21) Appl. No.: 16/871,197

(22) Filed: May 11, 2020

(65) Prior Publication Data

US 2020/0272437 A1  Aug. 27, 2020

Related U.S. Application Data

(63) Continuation of application No. 16/169,083, filed on Oct. 24, 2018, now Pat. No. 10,691,428.

(51) Int. Cl.
*G06F 8/36* (2018.01)
*G06F 8/20* (2018.01)
*G06F 8/34* (2018.01)

(52) U.S. Cl.
CPC .............. *G06F 8/36* (2013.01); *G06F 8/22* (2013.01); *G06F 8/34* (2013.01)

(58) Field of Classification Search
None
See application file for complete search history.

(56) References Cited

U.S. PATENT DOCUMENTS

| | | | | |
|---|---|---|---|---|
| 5,343,527 A | * | 8/1994 | Moore | G06F 21/16 380/30 |
| 5,671,415 A | * | 9/1997 | Hossain | G06F 8/20 700/96 |
| 5,734,597 A | * | 3/1998 | Molnar | G06F 9/451 715/764 |
| 6,111,572 A | * | 8/2000 | Blair | G06F 9/454 704/8 |

(Continued)

*Primary Examiner* — Adam Lee
(74) *Attorney, Agent, or Firm* — Buckley, Maschoff & Talwalkar LLC

(57) ABSTRACT

Provided is a method and system for building a compliance software service using reusable and configurable components. In one example, the method may include receiving a request to build a software in association with an identified jurisdiction from among a plurality of jurisdictions, retrieving a plurality of configurable software components which comprise built-in functionality that is generic across the plurality of jurisdictions, dynamically configuring non-generic functionality for the identified jurisdiction within the plurality of configurable software components based on inputs received from a user, and creating a software program for the identified jurisdiction based on the dynamically configured software components and storing a file including the created software program in a storage device.

20 Claims, 7 Drawing Sheets

(56) References Cited

U.S. PATENT DOCUMENTS

| | | | | |
|---|---|---|---|---|
| 6,141,005 A * | 10/2000 | Hetherington | G06Q 10/109 | 715/963 |
| 6,237,135 B1 * | 5/2001 | Timbol | G06F 8/34 | 717/107 |
| 6,275,810 B1 * | 8/2001 | Hetherington | G06Q 10/1093 | 709/224 |
| 6,513,040 B1 * | 1/2003 | Becker | G06F 9/4493 | |
| 6,748,055 B1 * | 6/2004 | Borman | H04M 3/487 | 379/88.16 |
| 7,103,875 B1 * | 9/2006 | Kaneko | G06F 9/454 | 717/125 |
| 7,194,506 B1 * | 3/2007 | White | G06F 16/9574 | 709/246 |
| 7,376,636 B1 * | 5/2008 | Wang | G06F 16/29 | 707/999.102 |
| 8,453,130 B2 * | 5/2013 | Benjamin | G06F 9/4488 | 717/148 |
| 9,201,665 B2 * | 12/2015 | Catalahana | G06F 9/451 | |
| 9,235,385 B1 * | 1/2016 | Subashchandrabose | G06F 8/658 | |
| 2002/0046240 A1 * | 4/2002 | Graham | G06F 8/24 | 709/203 |
| 2002/0174196 A1 * | 11/2002 | Donohoe | G06F 16/9535 | 709/219 |
| 2003/0073458 A1 * | 4/2003 | Walston | H04L 67/34 | 379/399.01 |
| 2003/0093471 A1 * | 5/2003 | Upton | G06F 9/541 | 719/314 |
| 2003/0131320 A1 * | 7/2003 | Kumhyr | G06F 9/454 | 715/205 |
| 2003/0135087 A1 * | 7/2003 | Hickle | G16H 20/10 | 600/26 |
| 2003/0200531 A1 * | 10/2003 | Fairweather | G06F 8/427 | 717/114 |
| 2003/0225725 A1 * | 12/2003 | Miller | G06F 16/29 | |
| 2004/0040015 A1 * | 2/2004 | Jordan, II | G06F 8/36 | 717/136 |
| 2004/0181756 A1 * | 9/2004 | Berringer | G06F 21/64 | 713/176 |
| 2005/0066315 A1 * | 3/2005 | Nguyen | G06F 9/454 | 717/136 |
| 2005/0137846 A1 * | 6/2005 | Rose | G06F 9/454 | 704/7 |
| 2006/0047710 A1 * | 3/2006 | Hu | G06F 16/20 | |
| 2006/0080613 A1 * | 4/2006 | Savant | G06Q 30/06 | 715/745 |
| 2007/0006039 A1 * | 1/2007 | Fichter | G06F 11/3688 | 714/38.14 |
| 2007/0061719 A1 * | 3/2007 | Law | G06Q 10/107 | 715/700 |
| 2007/0179795 A1 * | 8/2007 | Ordonez | G06Q 10/10 | 705/1.1 |
| 2007/0203754 A1 * | 8/2007 | Harrington | G06Q 10/00 | 705/3 |
| 2008/0189682 A1 * | 8/2008 | Rude | G06F 40/10 | 717/113 |
| 2008/0228524 A1 * | 9/2008 | Brown | G16H 10/60 | 705/3 |
| 2008/0295109 A1 * | 11/2008 | Huang | G06F 9/547 | 718/104 |
| 2009/0031170 A1 * | 1/2009 | Tsurumi | G06F 11/3696 | 714/38.14 |
| 2009/0106558 A1 * | 4/2009 | Delgrosso | G06F 21/41 | 713/184 |
| 2009/0165002 A1 * | 6/2009 | Sterbenz | G06F 9/4843 | 718/102 |
| 2009/0198647 A1 * | 8/2009 | Tong | G06F 9/454 | |
| 2010/0063854 A1 * | 3/2010 | Purvis | G06Q 10/02 | 705/5 |
| 2010/0088695 A1 * | 4/2010 | Kakinari | G06F 9/454 | 709/217 |
| 2010/0131531 A1 * | 5/2010 | Mason | G06F 3/065 | 707/E17.062 |
| 2010/0269099 A1 * | 10/2010 | Yoshimura | G06F 8/36 | 717/122 |
| 2011/0135280 A1 * | 6/2011 | Anbananthan | G11B 27/034 | 386/E5.028 |
| 2012/0022851 A1 * | 1/2012 | Bremner | G06F 9/454 | 704/3 |
| 2012/0054599 A1 * | 3/2012 | Nixon | G06F 40/143 | 715/236 |
| 2012/0065810 A1 * | 3/2012 | Narisawa | G06F 8/20 | 701/1 |
| 2012/0173442 A1 * | 7/2012 | Gupta | G06Q 50/184 | 705/310 |
| 2013/0091425 A1 * | 4/2013 | Hughes | G06F 40/58 | 715/264 |
| 2013/0254752 A1 * | 9/2013 | Nair | G06F 9/454 | 717/137 |
| 2013/0325516 A1 * | 12/2013 | Bheemanakatte | G06Q 10/10 | 705/4 |
| 2015/0178483 A1 * | 6/2015 | Kerber | H04W 4/50 | 726/30 |
| 2015/0347159 A1 * | 12/2015 | Fried | G06F 9/44505 | 710/104 |
| 2016/0170743 A1 * | 6/2016 | Shmulevich | G06F 8/30 | 717/120 |
| 2016/0196006 A1 * | 7/2016 | Doan | G06F 3/0485 | 715/779 |
| 2016/0210637 A1 * | 7/2016 | Kumar | G06Q 40/12 | |
| 2017/0032482 A1 * | 2/2017 | Whitmyer, Jr. | H04L 63/08 | |
| 2017/0046656 A1 * | 2/2017 | Bramble | G06F 16/9535 | |
| 2017/0094024 A1 * | 3/2017 | Braudes | H04L 67/34 | |
| 2017/0220966 A1 * | 8/2017 | Wang | G06Q 20/322 | |
| 2017/0337634 A1 * | 11/2017 | Ehrlich | H04W 4/029 | |
| 2017/0351824 A1 * | 12/2017 | DeGasperis | G06Q 20/102 | |
| 2019/0066239 A1 * | 2/2019 | Touchette | G06Q 20/3276 | |
| 2019/0213674 A1 * | 7/2019 | Ivankovich | G06Q 30/06 | |

\* cited by examiner

600

610 — Receive a Request to Build Software Associated with a Jurisdiction

620 — Retrieving Configurable Software Components with Built-in Uniform Functionality 630 — Dynamically Configuring Non-Uniform Functionality of the Configurable Software Components based on User Inputs 640 — Creating Software Program Based on Dynamically Configured Software Components

DIGITAL COMPLIANCE PLATFORM

CROSS-REFERENCE TO RELATED APPLICATION(S)

This application is a continuation of U.S. patent application Ser. No. 16/169,083, filed on Oct. 24, 2018, in the United States Patent and Trademark Office, the entire disclosure of which is incorporated herein for all purposes.

BACKGROUND

Electronic documents (i.e., eDocuments) provide organizations with the ability to generate, maintain, and submit business-related correspondence such as tax forms, invoices, purchase requests, orders, and the like. For example, eDocuments are often used for business-to-business (B2B) and business-to-government (B2G) communications. There is no single communication sequence for submitting an electronic document. Rather, each distinct document process involves its own unique sequence of steps. Furthermore, each country (or jurisdiction) often requires its own technical requirements for the process which can vary significantly from country-to-country. Accordingly, the amount of time and effort involved in complying with document submissions has increased significantly.

Traditional eDocument services are designed on a per-country basis. In other words, the steps of a document generation and exchange process are hard-coded within the software and are not capable of access or modification. This can be beneficial because it ensures that the document generation and submission process is followed correctly. However, when an organization conducts business globally or in multiple countries, they must use separately designed software services for each jurisdiction based on the different compliance requirements. This often requires the organization (or a third party) to develop each of the different software services from scratch. This can be time consuming and can also be difficult to keep up-to-date given that jurisdictional processes are always evolving. Accordingly, what is needed is a more efficient mechanism for developing compliance service software across different jurisdictions.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
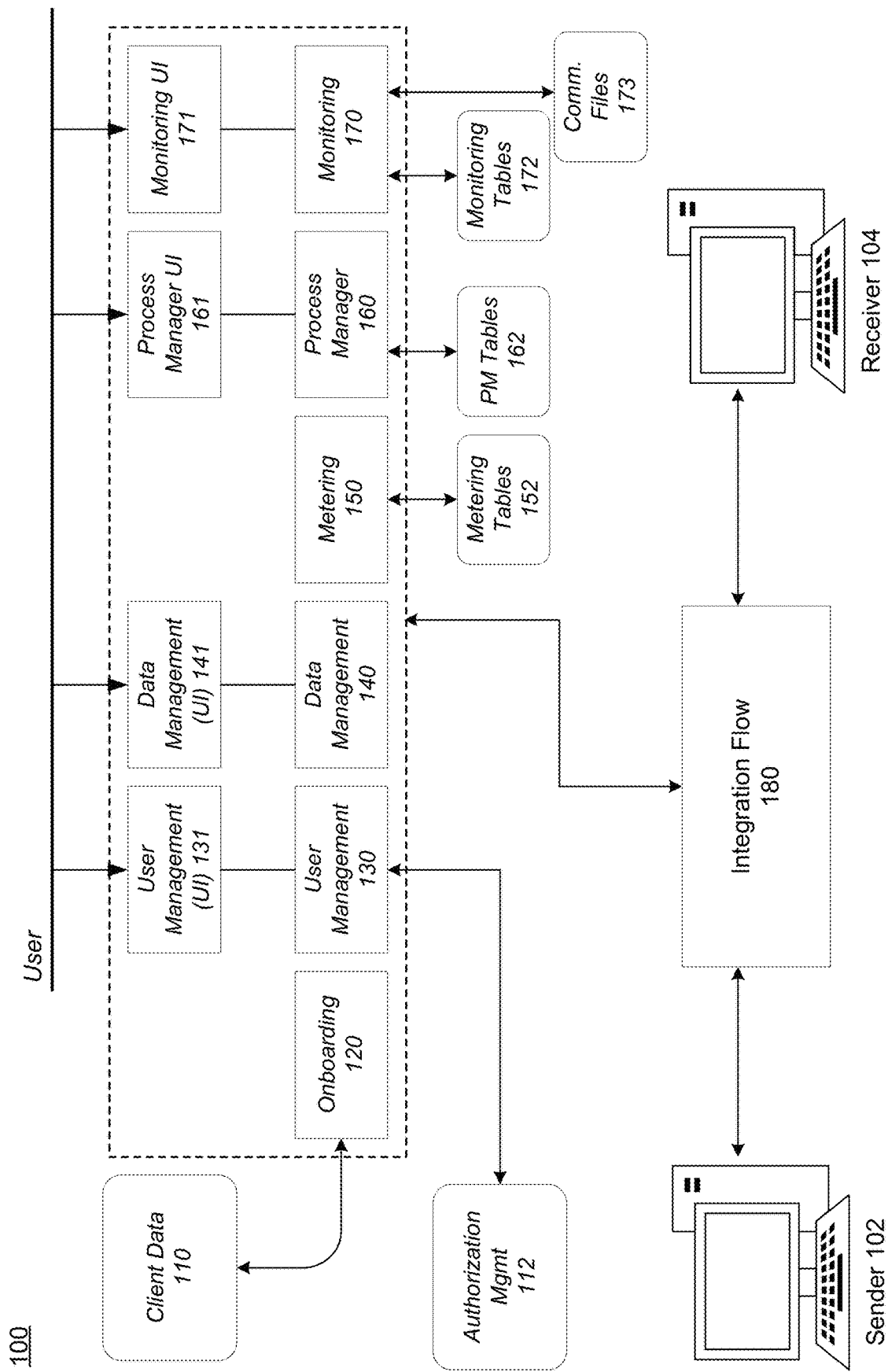
FIG. 1 is a diagram illustrating a digital compliance platform architecture in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Traditional compliance software is dedicated to ensuring an electronic document satisfies rules and regulations of a single jurisdiction. In other words, when generating electronic documents on behalf of a sender/receiver, the traditional digital compliance software ensures that the document complies with the regulations and technical requirements of a single jurisdiction. This limitation is in part because compliance information, regulations, technical requirements, and/or the like, are often hard-coded into the compliance software by the developer. As a result, there is no unified experience for a multi-country (multi-jurisdiction) legal or other compliance-based service application. This can be difficult when an organization has business dealings in multiple countries. In this case, the organization must use different versions of compliance software for each respective country.

The example embodiments overcome these drawbacks by introducing a centralized extensible architecture and reusable software components with built-in functionality that fit into the architecture. The architecture provides a framework that enables a developer to build a digital compliance software (service) for any jurisdiction in a standardized process using reusable configurable software components having built-in generic functionality. The generic functionality may be generic across all jurisdictions (e.g., countries) for which a service can be developed. In addition, some of the reusable software components may be dynamically configured by a user via a user interface to include non-generic functionality. Through the reusable software components, the architecture provides a standardized process for building a compliance service regardless of jurisdiction. In other words, a user/developer does not need to create their own code from scratch because the software structure is standardized. Furthermore, approximately half (e.g., 40-60%, etc.) of the functionality of the software components may be reusable/generic across each jurisdiction.

Through the digital compliance platform, a developer may configure or build a digital compliance service. The digital compliance service may be hosted within a cloud platform which provides a unified experience for B2G (business to government) and B2B (business to business) communications across different countries through the use of reusable software components which require minimal customizations. The platform may include an orchestration framework to manage the configurations of different B2B and B2G processes. Hardcoding the steps involved in the process within the code will lead to code maintainability issues and also strict limitations on jurisdiction. Instead, a process manger described herein may dynamically manage the process steps, statuses, entry criteria, and the like, for each country-specific implementation based on identifiers and status information.

The reusable software components may be loosely coupled from the regulations and requirements of a jurisdiction instead of the regulations and requirements being hard-coded into the software components. For each document submission (such as a legal document), the entities involved in each jurisdiction may be different, the steps involved may be different, the documents that are to be submitted may be different, and the like. The process manager software component can maintain all of the steps involved in a B2B or B2G communication sequence, which can be used to identify which steps are allowed and maintain the status (i.e., next step) of the process for a sender. The process manager may be implemented behind the scenes and my not directly interact with a user. Instead, the user may access an application which implements the process manger from a cloud service. A one-time configuration may be performed by the application (and country) where it is being used to configure the jurisdictional compliance requirements.

The digital compliance service that is developed via the architecture herein can be used by an external application to perform various document submission processes and other communications. For example, a process may include a sequence of steps involved with a communication such as submission of an electronic document. Each process may include a plurality of actions that must be performed in a particular order. The types of actions may include data transmissions, receipt of data, acknowledgments, notifications, queries, exchanges of information, and the like.

For business to government submissions, the communication process may include an action of formally submitting the electronic document (e.g., tax document, property document, etc.) to a government entity. For business to business submissions, the electronic document may include an invoice, bill of materials, sales and distributions, orders, and the like. Each document submission process may have different versions enabling actions to be customized based on particular rules and regulations. The underlying code which is used to implement the reusable software components may be designed in such a way that it is reusable across different software products and not hard-coded within the application. For example, the software components may be developed in Java and packaged as a jar file so that it can be consumed by different applications deployed in a cloud environment or other host environment.

In the examples herein, a digital compliance platform (DCP) defines a common architecture and provides configurable components that enables rapid development of a cloud service for hosting by a cloud platform which can cater to the business to business and business to government (B2G) communication needs of any country. Furthermore, a digital compliance service (DCS) is a service built to cater to the specific business to business and business to government needs of a country. DCP acts as a building block and provides reusable components to quickly build a new DCS for a respective country.

Some of the benefits of the example embodiments including a reduction in development effort and time. In particular, the reusable components may implement a significant portion of a country requirement, which reduces the development effort and time considerably. Another benefit is that maintenance is easier due to the reusable components. In particular, the common reusable components can be maintained once commonly instead of maintaining separate code lines catering to the similar functional requirements for every country/jurisdiction. The platform also makes it easier for support teams to support multiple country topics. Here, because the platform defines a common architecture for all jurisdictions, a common skillset can be used to maintain any country service built using DCP. This makes it possible for support teams to easily support multiple countries.

Other benefits include unified operations which can be done in an unified manner. Here, similar checks and alerts can be built which can be used for all the country services built using the platform. Other benefits include consolidated reporting and analytics that can be built once on top of the information stored in DCP monitor would allow to build a consolidated view which can show all country information in one dashboard. The platform also enables sharing of infrastructure resources like Java compute units, cloud platform integration among different country service teams, thus reducing the overall infrastructure costs. The platform may also use cloud platform integration extensively for enabling all the B2B and B2G communication scenarios, thus the major part of development is in building integration flows instead of writing code. As integration flows are configurable in nature they reduce chances of bugs, make testing easier and provide detailed logs by default for root cause analysis.

The example embodiments also provide for benefits to the users. In particular, the platform provides a common user interface for user management, master data management, metering, document monitor, and the like. Thus, the platform ensures a common user experience for a global customer running operations in multiple countries. The platform architecture may be built on top of a shared big tenant of cloud platform integration, thus multiple customers can be shared on the same tenant. The traditional approach required every customer to buy its own CPI tenant which resulted in much more costs. Because the platform provides a common architecture and user interface, once a user is trained for a country service, the user can very easily learn to use the country service of any other country with minimal training. Thus, the platform greatly reduces the training efforts required to enable a user for a new country. Also, the platform offers the same onboarding and offboarding experience across different jurisdictions.

FIG. 1 illustrates a digital compliance platform architecture 100 in accordance with an example embodiment. Referring to FIG. 1, the architecture 100 includes a plurality of reusable software components including an onboarding component 120, a user management component 130, a data management component 140, a metering component 150, a processor manager component 160, and a monitoring component 170. One or more of the components may include built-in functionality that is generic across all jurisdictions. The functionality of the components is further described in the examples of FIG. 3. A compliance service may have non-generic functionality which can be developed by a user such as a developer. However, a significant portion (e.g., 40 to 60%, etc.) of any service may be built without new development by designing these smaller components 120-170 to be configurable and then reusing them.

In some cases, reusable components may have a user interface component the enables a user such as a developer to configure the respective component. In the example of FIG. 1, a user management UI 131 is provided for entering user data into the user management component 130, a data management UI 141 is provided for entering master data into the data management component 140, a processor manager UI 161 for entering/configuring the process manager component 160, and a monitoring UI 171 for entering monitoring data into the monitoring component 170. The reusable components 120-170 may be integrated to provide a standard integration flow 180 that act as a framework on top of which country integration flows can be fit into. The integration flow 180 works in collaboration with the process manager 160 in a Java layer to orchestrate the business flow of an eDocument or other communication sequence for any country (jurisdictional) requirement between a sender 102 and a receiver 104.

In some cases, the digital compliance service designed via the architecture 100 may be built on top of a cloud platform or other host environment. In some cases, each consumer may own their own cloud platform tenant and platform integration tenant. As another example, a provider based cloud service approach or a Software as a Service (SAAS) approach may be implemented. In a consumer based service model, it is the responsibility of the customers to buy, manage and onboard their details on to their tenant. Meanwhile, in the example of the SAAS model the tenant is owned by the cloud platform. In this case, it is the responsibility of the platform to procure, manage and onboard client data 110 on to the tenant. The onboarding of the client data 110 may be performed by onboarding component 120. The onboarding component 120 may streamline the onboarding process and provides a common solution to enable automated onboarding for all DCS services.

The user management component 130 is provided by the platform to enable maintenance of users by a customer's administrator. A custom IDP (Identity Provider) is used by the platform as a user store. Here, the IDP provides a standard user interface to manage users but in case of DCP this cannot be used by customers as all customers share the same IDP. Hence the user management component 130 is provided and consists of application logic which may be in Java and the user management UI 131. An authorization management component 112 may manage user roles via an API. Data management component 140 maintains master data configurations for end users. For example, maintaining organization details like name, address, email, tax registration numbers, etc. The data management UI 141 enables these master data inputs along with providing basic CRUD operations for them.

The metering component 150 enables the platform to monitor the number of documents that are sent for processing to DCS applications on a regular basis. Based on the number of documents sent by each customer with respect to their partner Id, the provider can determine the pricing for the customer. Metering configuration data and aggregated metering data of document use may be held in metering tables 152 which may be stored in a database or other storage. The processor manager component 160 may be used to manage the configurations of different B2B and B2G processes. Hardcoding the steps involved in the process within the code will lead to code maintainability issues. Instead, the process manager component 160 may manage the process steps, statuses, entry criteria for a process step etc. for each country specific implementations in a loosely-coupled manner. Process manager tables 162 may be used to store status information of current process and steps required for different jurisdictional processes.

A large volume of logging information, files and data may be transferred during a documents transfer in B2B and B2G communications. The platform may provide the monitoring component 170 to store such information for a longer duration and to retrieve such information. For example, the document data may be tracked and stored within the monitoring tables 172 via a REST API. Each document may include log files that save information such as type, name, content type, and the like. The log files may be stored within the communication files storage 173.

Figure 2:
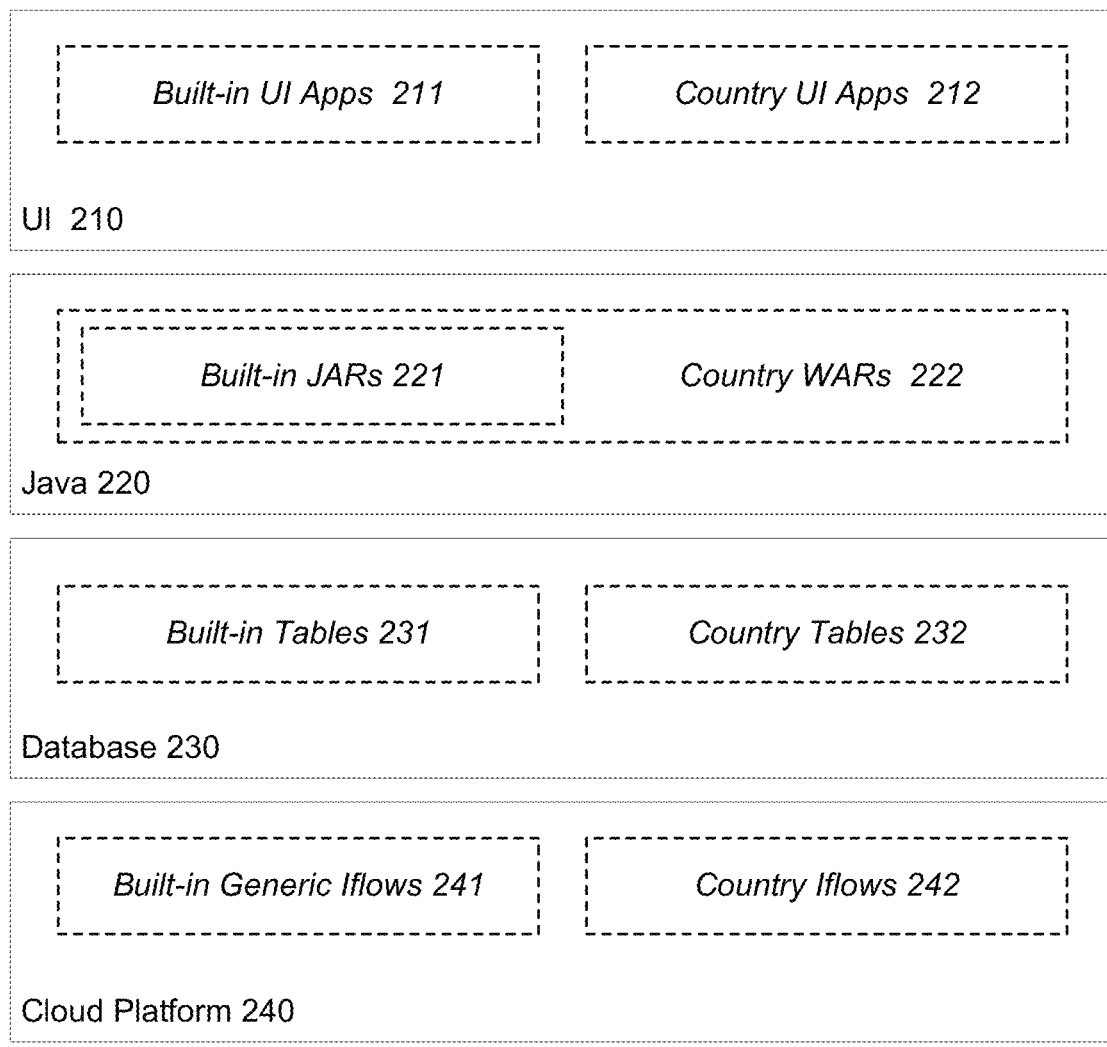
FIG. 2 is a diagram illustrating an architecture including the extensibility at different layers in accordance with an example embodiment.

FIG. 2 illustrates an architecture 200 including the extensibility of the digital compliance platform at different layers in accordance with an example embodiment. Referring to FIG. 2, the architecture 200 illustrates an extensibility of the architecture 100 shown in the example of FIG. 1. Referring to FIG. 2, the platform may provide a user interface layer 210 that includes user interface applications such as UI5 apps with built-in generic functionality. The user interface applications may include a documents monitor UI, a user management UI, a master data management UI, and the like, which could be used for any jurisdiction services. Meanwhile, non-generic jurisdictionally required (or optional) UIs may be added by a developer as per the specific needs of a country.

The architecture 200 also includes a Java layer 220 that provides generic java code libraries in the form of jar files. Each jurisdiction service can include these jar files which can be used to build a non-generic Java application that can consume the java code libraries offered by the platform. In the Java layer 220, jars may not be executable on their own. Instead, a web application resource (WAR) file that is built for a specific service including a specific jurisdiction is what may consume the jar file. The architecture 200 also includes a database layer 230 where the jar files provided by platform automatically create and manage tables required for the built-in Java functionality. Any additional tables could be created by a developer of a services for its purposes in the same database. Furthermore, the architecture 200 includes a cloud platform integration (CPI) layer 240. Within the CPI layer 240, the platform provides standard integrations flows that are generic to all jurisdictions and which act as a framework on top of which non-generic jurisdictional-specific integration flows can fit. The integration flows work in collaboration with the process manager component 160 shown in FIG. 1, to orchestrate the business flow for any specific jurisdictional service.

Figure 3:
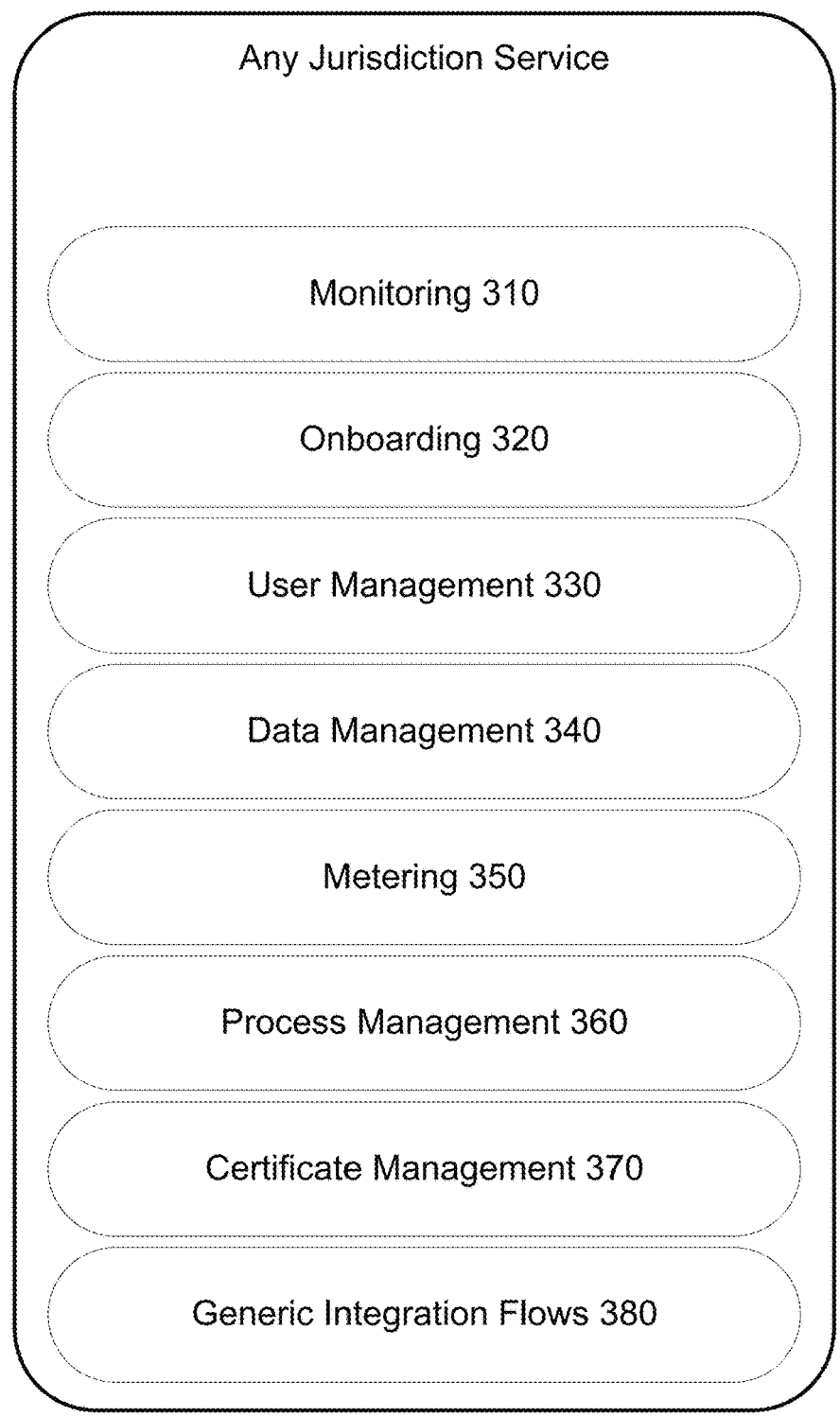
FIG. 3 is a diagram illustrating a list of reusable software components with built-in generic functionality in accordance with example embodiment.

FIG. 3 illustrates a list 300 of reusable software components with built-in generic functionality in accordance with example embodiment. Referring to FIG. 3, the reusable software components may include a monitoring component 310, an onboarding component 320, a user management component 330, a data management component 340, a metering component 350, a process management component 360, a certificate management component 370, and a generic Iflow component 380, which include generic functionality that is reusable across all jurisdictions (countries, etc.).

The monitoring component 310 may be a documents monitor. A large volume of logging information, files and data may be transferred during the documents transfer in B2B and B2G domains. The monitoring component 310 may store such information and to retrieve such information. Documents or reports may be sent from an enterprise resource central component (ECC) source system to a cloud platform integration flow. The input to the monitoring 310 back-end API may be data coming in as JSON/XML format from a replicator integration flow and the monitoring component 310 may persist the data in the monitoring database in different tables via REST communication.

The monitoring data may contain fields such as partner Id, organization Id, process, source document type, source document Id, communication Id, document Name, document status, country, process status, versioning details, current action etc. and some custom fields to handle country specific additional fields. Each document log can contain N file logs and file log can have file information such as type, file-name, content-type and content in Base64 encoding. A document service may be used for storing file log content and error log content.

In operation, if the same document log is posted again with the same partner Id, organization Id, source document type, source document Id, process but with a new communication Id, then an existing document log may be moved to document log history and document log table will be updated with the new record. Customers may have multiple options to filter the results based on process and process statuses on UI. For each customer there may be a unique Id maintained which is called a partner Id in a digital compliance service application. The monitoring component 310 may be available as part of dcp-core jar. In some embodiments, a country field handler design is provided for providing specific functionalities or validations based on each country requirements. In some embodiments, the monitor application is based on a multitenancy model.

The onboarding component 320 may be used to automatically retrieve customer data. A digital compliance service may be sold to a customer through direct sales or a partner reseller. The sales representative or a person with similar responsibility creates a new contract in ICP (CRM) system. A material number determines the DCS country version, quantity determines the block of documents purchased. Here, the ICP system triggers a provisioning request to a statistical processing control (SPC) system, passing the contract information. Based on the tenant product type or the material number, the SPC determines SPC process and starts it.

An SPC process may be configured with various tasks that are executed in the same order. For example, the onboarding API may perform one or more of the following functions, including, but not limited to generating a new Partner ID, updating the partner ID along with other received information into a CPI partner directory, creating a new user in the IDP and updates the user ID against the partner ID in the partner directory of CPI, updating the metering tables in SCP DB with the number of documents allocated to the customer as per the quantity maintained in the contract, and the like. On successful completion of the API, the API returns a response containing the partner ID and other information needed to be updated back in SPC and to be sent as a mail to the customer. Here, the SPC updates the returned partner ID and passes this along with the other information back to ICP (CRM). The ICP system determines the appropriate mail template and triggers a mail to the customer contact with the information received from DCS.

The user management component 330 is provided to enable maintenance of users by the customer admin. A custom IDP (Identity Provider) may be used by platform as a user store. The IDP provides a standard screen to manage users it may not be usable by all customers. Hence the user management component 330 is built which consists of application logic in Java and a user interface. It provides the integration between the identity provider and cloud platform authorizations. The user interface for user management provides a convenient place for the customer to create and maintain users for the application and to provide the authorization to the user for specific operations. The user management UI provides various operations for an admin of the customer such as user creation, authorization assignment, user modification/deletion, and the like.

A data management component 340 which is common across country specific services may be used to maintain master data configurations for end users. For example, maintaining organization details like name, address, email, tax registration numbers, etc. A user interface component is provided that enables a user to input master data along with providing basic CRUD operations on them.

Creation of an application for each country service adds an overhead for the developers, when the nature of each of these would be similar. Moreover, since there are no common standards, each country service would have its own version (UI design) of these applications. This is not efficient because the end user has a different user experience across different country version of the same kind of application. Therefore, the data management component 340 provides a central master data application from the digital compliance platform. The master data management application provides a reusable user interface which can be utilized by various country services to develop and deploy a master data configuration screen in no time.

The metering component 350 may provide a "pay per usage" meter or other suitable metering approach. The metering component 350 may monitor the number of documents that are sent for processing to services. Based on the number of documents sent by each customer with respect to their partner Id, the metering component 350 may determine a pricing for the customer. A metering configuration table may hold the configuration required for metering each customer. The data for this table may be populated from the onboarding service of the digital compliance platform while onboarding a customer. The metering data table may hold the number of documents posted by each customer for a process. The data for this table is populated from the platform specific generic Integration flow (Iflow) which is the entry point for any documents flowing into digital compliance services. The count of number of documents is temporarily maintained in the CPI data store and then pushed to the platform's metering service daily.

Figure 5:
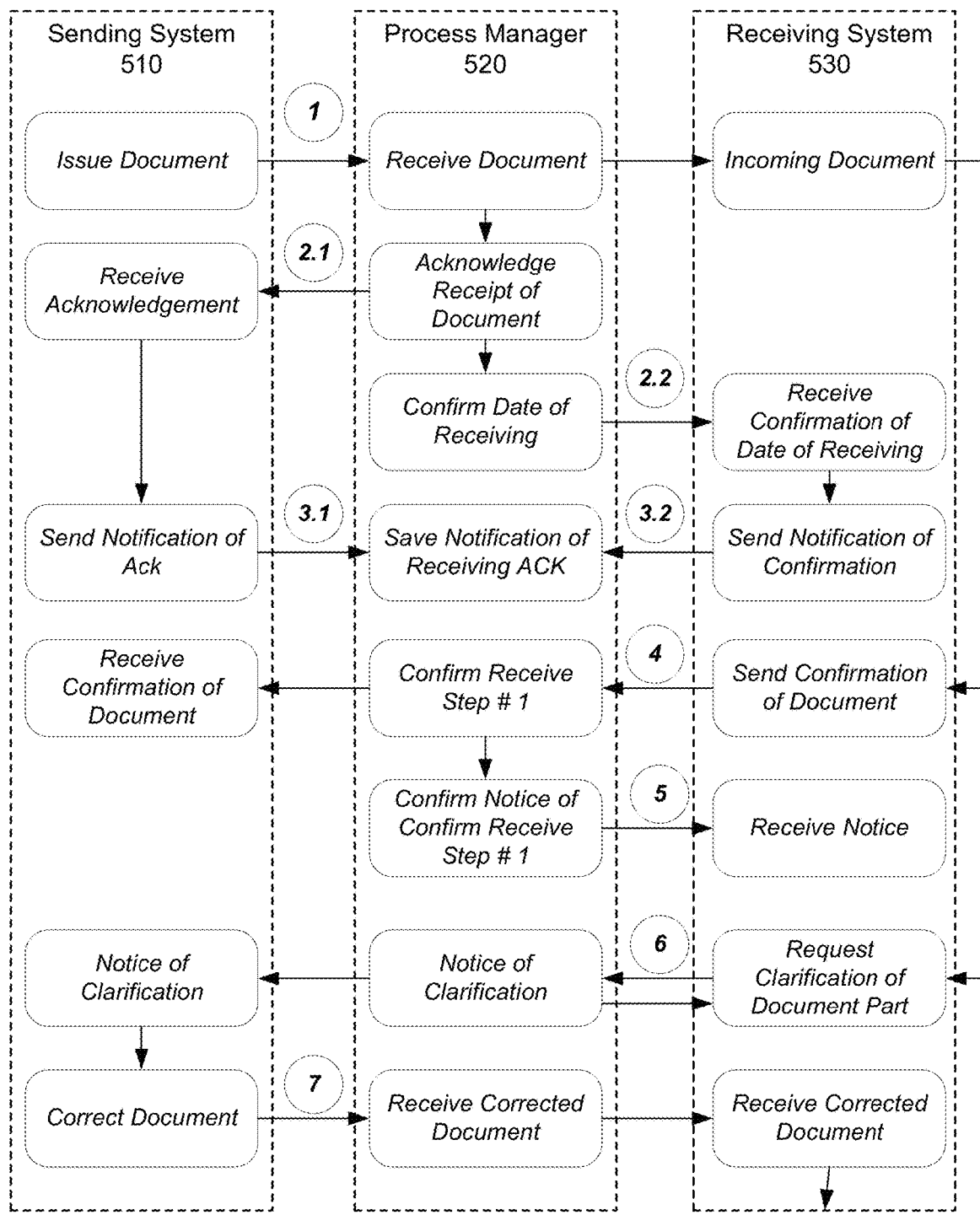
FIG. 5 is a diagram illustrating a communication sequence implemented by a process manager in accordance with an example embodiment.

An example of the process manager component 360 is shown and described with respect to FIG. 5. The process manager may perform various functions for digital communications sequences and may streamline the execution of the process step and the checks in which resulting statuses are configurable and not part of the coding. Less coding is needed to maintain the process manager. The processor manager component 360 may checks if the process step or action is allowed based on the configurations. Furthermore, the process manager component 360 may determines the new status of the process based on the execution of a process step and determine possible subsequent steps based on the current process status.

The certificate component 370 provides the functionality to sign the documents of the user's own certificates. Users can upload their certificate and use these certificate for signing the documents before sending to the other vendor/party. The digital compliance platform may support X.509 certificates and only one certificate may be allowed per user. The user can upload, delete, update their certificates with the provided user interface.

The generic Iflow component 380 enables orchestration of the country specific business flows. The processes need to be configured in the process manager and the generic integration flows call the country or jurisdiction-specific integration flows accordingly. The generic integration flow may be the main integration flow which exposes the API's for external consumption. It offers the SOAP, REST and a process direct endpoint. The SOAP endpoint may be used by the backend ERP systems, the REST endpoint may be used by the user interface and the process direct may be used in a scenario where the country service is not directly consuming the generic integration flow, instead a country Iflow is exposing an external API for the consumption by ERP systems.

The documents which are submitted through the Digital Compliance Platform API may be queued up for processing which makes their status immediately not available to the caller. Post processing, the status gets persisted in the database via the monitoring component 310. Along with the status there might be files which were generated as a result of processing and they get persisted in the document store. Thus to retrieve the current status of the document along with response files if any, a Send Query Iflow may be used. For example, the send query Iflow may be used by the country specific Iflow when there is a need to do bulk upload of schemas/xml to the partner directory. The files that needs to be pushed to the partner directory may be placed in the server as per the configured directory. Once the Iflow channel is started it polls for the files in the source directory and does an auto upload to the target partner directory as per the configuration.

Figure 4:
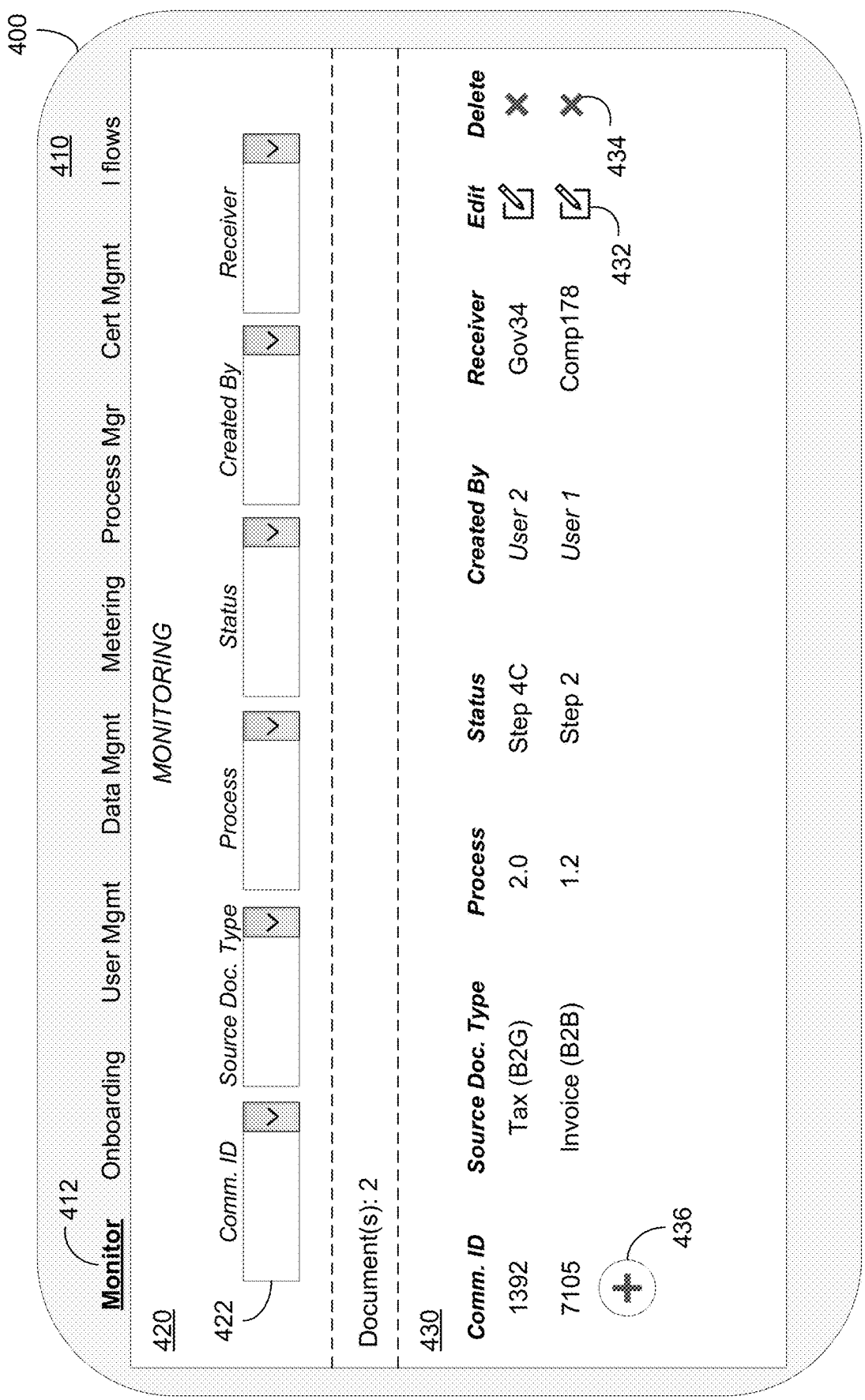
FIG. 4 is a diagram illustrating a user interface for configuring the reusable software components in accordance with an example embodiment.

FIG. 4 illustrates a user interface 400 for configuring the reusable software components in accordance with an example embodiment. For example, the user interface 400 may be used to configure (or otherwise define non-generic functionality) for one or more of the reusable software components 120, 130, 140, 150, 160, 170, and the like. In this example, a monitoring component is being interacted with to define what kinds of monitoring information are collected by the platform during a document communication process. Here, a panel 410 allows the user to navigate between different reusable software components. In this case, the monitoring component tab 412 is selected displaying a monitoring screen 420. Within the monitoring screen 420, a user may configure a plurality of items 422 for configuring what types of data is monitored per document communication process. In some embodiments, the screen 420 may also include a document screen 430 in which pending documents/communications are currently shown. Here, a user may also have an option to edit 432 a communication monitoring process, delete 434 a communication monitoring process, and add 436 a new communication monitoring process.

It should be appreciated that the user interface 400 and the screens 420 and 430 should not be construed as limiting the example embodiments but are simply used as one example. The user interface may be interacted with for one type of reusable component or multiple reusable components (as shown in the example of FIG. 4). It should also be appreciated that different UIs may be provided for different reusable software components. Also, a user may have the option to view source code and monitor the underlying source code of a reusable software component via the user interface 400.

FIG. 5 illustrates an example of a document communication process 500 in accordance with an example embodiment. Referring to FIG. 5, the communication process 500 is between a sending device 510 and a receiving device 530, via a process manager 520. For example, the process manager 520 may be implemented on a host platform that is connected to the sending device 510 and the receiving device 530 via a network. In this example, the communication process 500 includes a plurality of sequential actions (e.g., steps 1-7, etc.) which must be adhered to satisfy compliance requirements of a particular jurisdiction when submitting a document. An identification of the steps, the order of the steps, and the like, may be maintained by the process manager 520. Each time a communication (or step) is received from either the sender 510 or the receiver 530, the process manager 520 may dynamically determine whether the communication is allowed. When an action is allowed, the process manager 520 may ensure the action is performed and update a current status of the process between the sender 510 and the receiver 530 in a status database or other storage. When an action is not allowed, the process manager 520 may notify the sender 510 and/or the receiver 530 that such action is not allowed.

In some cases, multiple steps may be available. For example, after step 1 is performed, both steps 2.1 and 2.2 are available. The interconnection of steps may be different for each type of jurisdiction/country. The process manager 520 may be configured for a particular jurisdiction based on an initial setting of the application used by the sender 510 or the receiver 530. Accordingly, the process manager 520 may be consumed by software on the sending device 510 and the receive device 530. The process manager may keep a storage of different document submission processes for a particular jurisdiction. Each time the sender 510 and the receiver 530 submit a communication to the process manager 520, the communication may have a header which identifies a process (via a process ID) and an action associated with the process (via an action ID). This way, the process manager 520 knows which process and which step of the process the communication is associated with. Furthermore, the process manager 520 may also receive an identifier of the sender and/or the receiver. The process manager 520 may use the sender identifier to determine a current status of the process being performed. Here, the process manager 520 may compare the step of the process associated with the communication with the current status of the process, to determine if the communication request is allowed.

The process manager described herein may interact with process status information stored within a storage and which maintains a current status of a communication sequence being performed by a user. The process manager may receive a message or document from a sender device requesting that an action be performed such as sending the document to a receiving device for performing a B2B or B2G communication. Within the message may be a header or other metadata that identifies a process associated with the requested communication, and an action or step of the process. The process ID may be used by the process manager to identify a communication sequence which includes a plurality of steps while the action ID may be used to identify a particular step from the communication sequence. The process steps may be varied and thus may include multiple versions. For example, a process may include a plurality of steps which are marked with status flags making it possible to alter which steps are associated with which process version based on which status flags are marked as on or off.

In this example, the process manager may determine that the process has a predefined number of steps based on the process ID within the message, and a current step that is being performed by the message based on the action ID. The process ID may be mapped to an underlying process from among multiple possible processes. Meanwhile, the action ID may be used to identify which step from the process is being performed.

Furthermore, the process manager may determine a current status of a communication process being performed by the sender in communication with another device (e.g., B2B or B2G) based on the sender ID. Here, the sender ID may be used to identify a current status of the process from a sender status table which identifies a current status of the communication process. When the action identified based on the process ID and the action ID matches a currently available step of the current status of the sender, the process manager may perform the communication by forwarding the communication to a receiving device (not shown).

The process manager may be written in Java and may be deployed either as an independent service in a cloud platform or can be embedded as a jar in any application being deployed in a cloud platform. This makes the process manager highly reusable. Because the process manager is generic, it can be offered as a service in the cloud so that it can be used across multiple products for process orchestration. The process manager maintains detailed information on all the steps required for an action in a single call so that the number of calls to an application programming interface (API) of the process manager is reduced. The process manager provides the flexibility to configure the sequence in which the process steps are to be performed so that independent steps can be performed in parallel.

In some embodiments, the process manager has the flexibility to configure an Iflow (Integration flow) to be called for a process step, a java method or even an external API which supports additional use-cases when compared to a related on-premise process manager. The process manager described herein also provides information on a queue name for queuing of the requests while control is passed from one Iflow to another. It also provides information on if a status update to the user is required for a process step.

The process manager may be exposed as a REST API so that the process manager can be called from Iflows deployed in the SAP Cloud Integration. This extends the scope of usage of the process manager for different platforms. The process manager may provides response in a standard JSON format so consuming it in any application is easier and can be easily converted into XML if required for using in Iflows. Because it is delivered as a jar, in-process calls within the java app is possible for applications using the jar, which will improve the performance significantly in comparison to a REST API call. The process manager also provides an interface which can be implemented in the applications using process manager to do any extensions if required.

The process manager may be called through an API request or message. For example, the API endpoint may be /api/v1/int/callProcessManager. Within the API request may be a header which includes various identifiers. The identifier may include, but are not limited to, an action ID which specifies the action to be performed on s document (e.g., create, submit, acknowledge, etc.), a process ID which may identify a process and may include a combination of process name and process version, an organization ID which is the organization ID of the customer, a partner ID which is a partner ID of the customer as defined in a partner directory, a document type ID which identifies a type of document as defined in the system, a document ID which is a unique identifier for the document which is usually the source document ID, and the like.

Organization ID, partner ID, document ID, and document type ID may help the process manager to determine the current status of a document. These details may be passed in the request header and a default implementation may be written to fetch the status of the document from the logging tables (status DB, etc.). However, this implementation can be changed by the applications using process manager to fetch the status of the document from some other source as well based on the details provided in the request header. Action ID and process ID may be used to get the process step details and status details for a particular process and action based on the configuration maintained in process manager tables. Meanwhile, one or more of organization ID, partner ID, document ID and document type may be used to get the status of the document. This status may then be used to determine if an action is allowed by checking against the process manager table (Process Check Status Flag). In some cases, a Process Status Flag table holds the different possible status of a communication and the Process Status Flag Position table holds the position of each of the flags.

Figure 6:
FIG. 6 is a diagram illustrating a method for building a digital compliance software in accordance with an example embodiment.

FIG. 6 illustrates a method 600 for building a digital compliance software in accordance with an example embodiment in accordance with an example embodiment. As an example, the method 600 may be executed by a digital compliance platform that is hosted by a cloud computing environment, a web server, a user device, or the like. As another example, the method 600 may be performed by another type of device such as computing system, a server, a database, or a combination of devices such as multiple nodes of a database, a cloud platform, and the like.

Referring to FIG. 6, in 610, the method may include receiving a request to build a software in association with an identified jurisdiction from among a plurality of jurisdictions. Here, the request may be submitted by a user via a user interface. The request may be submitted locally by a device executing the method or it may be received via a network, and the like. The jurisdiction may correspond to a country or other compliance-based jurisdictional area, from among many possible countries. In some embodiments, the method may also include receiving a selection of the identified jurisdiction via an application programming interface (API) of a digital platform for building software. For example, the jurisdiction may be provided or otherwise selected during an initial onboarding process which occurs via an API of the digital compliance platform.

In 620, the method may include retrieving a plurality of configurable software components which each include built-in functionality that is generic across the plurality of jurisdictions. The configurable software components may be reusable across all jurisdictions. In other words, the functionality which is built-in may be generic such that it can be incorporated within compliance functionality for B2B and B2G communications in multiple jurisdictions. The built-in functionality may be tested before to ensure that it works. Therefore, a developer does not need to test the built-in functionality. Furthermore, the reusable software components may be standardized such that the user is only required to configure various settings via drop-down boxes, selections, buttons, and the like, rather than having to generate source code. However, it is also possible for the user to be able to generate and incorporate their own source code, if necessary.

In some embodiments, a configurable software component may include a user management component with built-in generic functionality for maintenance of users that access the created software program. In some embodiments, a configurable software component from among the plurality may include a data management component that describes fields and layouts for display in the created software program. As another example, a configurable software component from among the plurality may include a metering component that monitors usage of resources by the created software program. As another example, a configurable software component from among the plurality may include an orchestrator (e.g., process manager, etc.) configured to manage communication processes carried out by the created software program. Meanwhile, the non-generic functionality included within one or more of the reusable software components may be one or more of data mapping between client data and the created software program and user interface features associated with the identified jurisdiction.

In 630, the method may include dynamically configuring non-generic functionality for the identified jurisdiction within the plurality of configurable software components based on inputs received from a user. For example, the dynamically configuring may include receiving inputs via a user interface and dynamically configuring the non-generic functionality based on the user inputs. In some embodiments, the user interface may be generic, common, uniform, etc. across all of the plurality of jurisdictions. Therefore, when a user develops a respective service for different jurisdictions, the user can be more efficient because the user interface will be the same when configuring each respective service. In 640, the method may include creating a software program for the identified jurisdiction based on the dynamically configured software components and storing a file including the created software program in a storage device. For example, the file may be an executable file that is stored on the cloud platform, a user device, a web server, a database, or the like.

Figure 7:
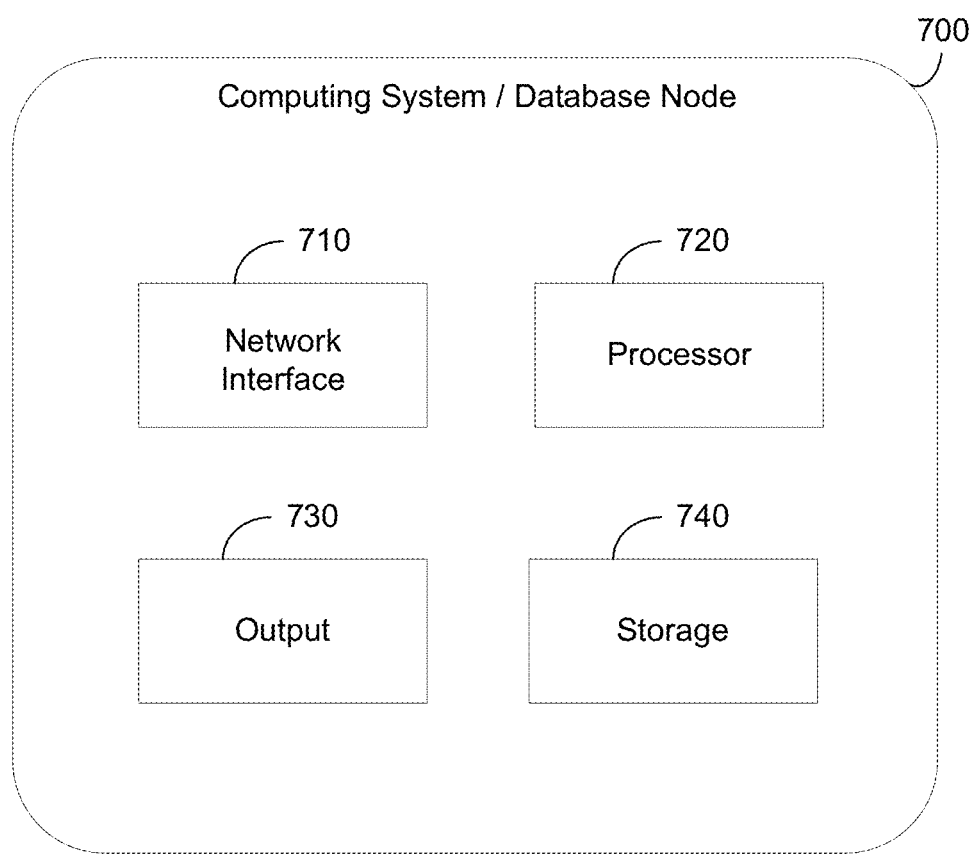
FIG. 7 is a diagram illustrating a computing system for use in the systems, processes, and methods described herein.

FIG. 7 illustrates a computing system 700, in accordance with an example embodiment. For example, the computing system 700 may be a database node, a server, a cloud platform, a user device, or the like. In some embodiments, the computing system 700 may be distributed across multiple devices. Referring to FIG. 7, the computing system 700 includes a network interface 710, a processor 720, an output 730, and a storage device 740 such as an in-memory. Although not shown in FIG. 7, the computing system 700 may also include or be electronically connected to other components such as a display, an input unit, a receiver, a transmitter, a persistent disk, and the like. The processor 720 may control the other components of the computing system 700.

The network interface 710 may transmit and receive data over a network such as the Internet, a private network, a public network, an enterprise network, and the like. The network interface 710 may be a wireless interface, a wired interface, or a combination thereof. The processor 720 may include one or more processing devices each including one or more processing cores. In some examples, the processor 720 is a multicore processor or a plurality of multicore processors. Also, the processor 720 may be fixed or it may be reconfigurable. The output 730 may output data to an embedded display of the computing system 1000, an externally connected display, a display connected to the cloud, another device, and the like. For example, the output 730 may include a port, an interface, a cable, a wire, a board, and/or the like, with input/output capabilities. The network interface 710, the output 730, or a combination thereof, may interact with applications executing on other devices.

The storage device 740 is not limited to a particular storage device and may include any known memory device such as RAM, ROM, hard disk, and the like, and may or may not be included within the cloud environment. The storage 740 may store software modules or other instructions which can be executed by the processor 720 to perform the method 700 shown in FIG. 7. According to various embodiments, the storage 740 may store database files and may have a partitioning scheme as shown or described in the examples herein. The storage may include a data store having a plurality of tables, partitions and sub-partitions.

According to various embodiments, the processor 720 may receive a request to build a software in association with an identified jurisdiction from among a plurality of jurisdictions. For example, the request may be received via the network interface 710 via selection made by a user via a user interface being displayed on a user device connected to the computing system 700 via a network. The processor 720 may retrieve a plurality of configurable software components from the storage device which include built-in functionality that is generic across the plurality of jurisdictions. The processor 720 may dynamically configure non-generic functionality for the identified jurisdiction within the plurality of configurable software components based on inputs received from a user via a user interface. The processor 720 may create a software program for the identified jurisdiction based on the dynamically configured software components and store a file including the created software program in the storage 740.

In some embodiments, the identified jurisdiction may be provided during an onboarding process performed by the processor 720. In this example, a user device may transmit the onboarding data including the identified jurisdiction to the computing system 700 (such as a digital compliance platform) via an API of the digital compliance platform. In some embodiments, the processor 720 may be configured to receive inputs via a common user interface for dynamically configuring the non-generic functionality, and the common user interface may include a uniform design or format across the plurality of jurisdictions.

In some embodiments, the configurable software components may include one or more of a user management component with built-in generic functionality for maintenance of users that access the created software program, an onboarding component for onboarding document data, a data management component that describes fields and layouts for display in the created software program, a metering component that monitors usage of resources by the created software program, an orchestrator (e.g., process manager, etc.) configured to manage communication processes carried out by the created software program, a certificate authority for managing government or other compliance certificates, an iflow generator, and the like. Meanwhile, the non-generic functionality included within one or more of the reusable software components may be one or more of data mapping between client data and the created software program and user interface features associated with the identified jurisdiction.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a storage configured to store a plurality of reusable Java Archive (JAR) files which comprise built-in libraries with jurisdiction-generic functionality; and
   a processor configured to
     receive, via a user interface, first compliance rules specific to a first jurisdiction for executing an electronic document process in the first jurisdiction;
     generate a first version of the electronic document submission process that satisfies the first compliance rules by integrating the first compliance rules with the plurality of JAR files, the first version of the electronic document submission process comprising submitting an electronic document within the first jurisdiction;
     receive, via the user interface, different second compliance rules specific to a different second jurisdiction for executing the electronic document process in the second jurisdiction;
     generate a different second version of the electronic document submission process that satisfies the second compliance rules by integrating the second compliance rules with the plurality of JAR files, the second version of the electronic document submission process comprising submitting the electronic document within the second jurisdiction;
     build a Java application for a particular jurisdiction from among the first and second jurisdictions based on a web application resource (WAR) file with functionality specific to the particular jurisdiction and a JAR file from among the plurality of JAR files; and
     execute the Java application, wherein executing the Java application executes the respective version of the electronic document submission process within the particular jurisdiction.

2. The computing system of claim 1, wherein the user interface comprises a uniform design among the first and second jurisdictions.

3. The computing system of claim 1, wherein a JAR file from among the plurality of JAR files comprises a user management component with built-in generic functionality for maintenance of users.

4. The computing system of claim 1, wherein a JAR file from among the plurality of JAR files comprises a data management component that describes fields and layouts of the user interface for display.

5. The computing system of claim 1, wherein the electronic document submission process further comprises different requirements in the first and second jurisdictions.

6. The computing system of claim 1, wherein the processor is configured to create a web application in an object-oriented programming language that includes the second version of the electronic document submission process.

7. The computing system of claim 1, wherein the electronic document submission process comprises a sequence of communications between a sender and a receiver of the electronic document.

8. The computing system of claim 1, wherein the compliance rules comprise compliance rules for one or more of a business-to-business (B2B) communication flow and a business-to-government (B2G) communication flow.

9. A method comprising:
   storing a plurality of reusable Java Archive (JAR) files which comprise built-in libraries with jurisdiction-generic functionality;
   receiving, via a user interface, first compliance rules specific to a first jurisdiction for executing an electronic document process in the first jurisdiction;
   generating a first version of the electronic document submission process that satisfies the first compliance rules by integrating the first compliance rules with the plurality of JAR files, the first version of the electronic document submission process comprising submitting an electronic document within the first jurisdiction;
   receiving, via the user interface, different second compliance rules specific to a different second jurisdiction for executing the electronic document process in the second jurisdiction;
   generating a different second version of the electronic document submission process that satisfies the second compliance rules by integrating the second compliance rules with the plurality of JAR files, the second version of the electronic document submission process comprising submitting the electronic document within the second jurisdiction;
   building a Java application for a particular jurisdiction from among the first and second jurisdictions based on a web application resource (WAR) file with functionality specific to the particular jurisdiction and a JAR file from among the plurality of JAR files; and executing the Java application, wherein executing the Java application executes the respective version of the electronic document submission process within the particular jurisdiction.

10. The method of claim 9, wherein the user interface comprises a uniform design among the first and second jurisdictions.

11. The method of claim 9, wherein a JAR file from among the plurality of JAR files comprises a user management component with built-in generic functionality for maintenance of users.

12. The method of claim 9, wherein a JAR file from among the plurality of JAR files comprises a data management component that describes fields and layouts of the user interface for display.

13. The method of claim 9, wherein the electronic document submission process further comprises different requirements in the first and second jurisdictions.

14. The method of claim 9, wherein the creating comprises creating a web application in an object-oriented programming language that includes the second version of the electronic document submission process.

15. The method of claim 9, wherein the electronic document submission process comprises a sequence of communications between a sender and a receiver of the electronic document.

16. The method of claim 9, wherein the compliance rules comprise compliance rules for one or more of a business-to-business (B2B) communication flow and a business-to-government (B2G) communication flow.

17. A non-transitory computer-readable medium comprising instructions which when executed by a processor cause a computer to perform a method comprising:
    storing a plurality of Java Archive (JAR) files which comprise built-in libraries with jurisdiction-generic functionality;
    receiving, via a user interface, first compliance rules specific to a first jurisdiction for executing an electronic document process in the first jurisdiction;
    generating a first version of the electronic document submission process that satisfies the first compliance rules by integrating the first compliance rules with the plurality of JAR files, the first version of the electronic document submission process comprising submitting an electronic document within the first jurisdiction;
    receiving, via the user interface, different second compliance rules specific to a different second jurisdiction for executing the electronic document process in the second jurisdiction;
    generating a different second version of the electronic document submission process that satisfies the second compliance rules by integrating the second compliance rules with the plurality of JAR files, the second version of the electronic document submission process comprising submitting the electronic document within the second jurisdiction;
    building a Java application for a particular jurisdiction from among the first and second jurisdictions based on a web application resource (WAR) file with functionality specific to the particular jurisdiction and a JAR file from among the plurality of JAR files; and
    executing the Java application, wherein executing the Java application executes the respective version of the electronic document submission process within the particular jurisdiction.

18. The non-transitory computer-readable medium of claim 17, wherein the user interface comprises a uniform design among the first and second jurisdictions.

19. The non-transitory computer-readable medium of claim 17, wherein a JAR file from among the plurality of JAR files comprises a user management component with built-in generic functionality for maintenance of users.

20. The non-transitory computer-readable medium of claim 17, wherein the compliance rules comprise compliance rules for one or more of a business-to-business (B2B) communication flow and a business-to-government (B2G) communication flow.

\* \* \* \* \*